United States Patent
Chatterjee et al.

[11] Patent Number: 5,711,912
[45] Date of Patent: Jan. 27, 1998

[54] METHOD FOR ENCAPSULATING ELEMENTS SUCH AS MAGNETS IS SINTERED CERAMIC MATERIALS

[75] Inventors: Dilip K. Chatterjee, Rochester; Edward Paul Furlani, Lancaster; Syamal K. Ghosh, Rochester, all of N.Y.

[73] Assignee: Eastman Kodak Company, Rochester, N.Y.

[21] Appl. No.: 665,027

[22] Filed: Jun. 16, 1996

[51] Int. Cl.⁶ .................................................. C04B 33/32
[52] U.S. Cl. .................. 264/428; 264/611; 264/612; 264/642; 427/226
[58] Field of Search ................................ 264/60, 61, 62, 264/428, 611, 612, 642; 427/226

[56] References Cited

U.S. PATENT DOCUMENTS

| | | |
|---|---|---|
| 2,820,720 | 1/1958 | Iversen . |
| 2,844,363 | 7/1958 | Clark . |
| 3,536,798 | 10/1970 | Nyman ................................ 264/62 |
| 3,879,234 | 4/1975 | Lee . |
| 4,026,746 | 5/1977 | Straw ................................. 427/226 |
| 4,201,831 | 5/1980 | Slusarczyk . |
| 4,837,114 | 6/1989 | Hamada . |

FOREIGN PATENT DOCUMENTS 2203017   8/1990   Japan .

*Primary Examiner*—James Derrington
*Attorney, Agent, or Firm*—Edward Dugas

[57] ABSTRACT

A process for forming a ceramic coated element formed by first encapsulating the element within a sacrificial material and then encapsulating the element and the sacrificial material with an unsintered ceramic material. The resultant combination of materials and elements is then controllably heated to a temperature that burns the sacrificial material prior to the curing of the ceramic material so as to permit the permeation of the burned sacrificial material through the ceramic material. As the ceramic material is sintered it shrinks around the encapsulated element to form the ceramic coated element. In the preferred embodiment of the invention the coated element is a magnet or magnetizable material that is magnetized to a preferred axis of magnetization during the cooling phase of the process.

2 Claims, 2 Drawing Sheets

METHOD FOR ENCAPSULATING ELEMENTS SUCH AS MAGNETS IS SINTERED CERAMIC MATERIALS

FIELD OF THE INVENTION

The invention relates generally to the field of ceramic molding, and in particular to the protection of magnets in a corrosive environment by encapsulating the magnets in a ceramic material.

BACKGROUND OF THE INVENTION

Numerous processes in the manufacture of photographic films and papers entail the use of corrosive chemicals such as silver halide emulsions and organic solvents and chemical reagents. Because of the corrosive nature of many chemicals and environmental hazard, these chemicals are mixed, stirred and pumped in sealed containers. The most common methods for implementing the mixing and pumping of such fluids entail the use of some form of magnetic coupling between an external power source and an internal propeller/mixer. The internal mixing component (propeller) is either attached to, or made from (at least partially) a polarized magnetic material such as NdFeB. However, the magnetic materials themselves are susceptible to corrosion, and therefore need to be coated with a corrosion resistant material. A number of coating processes have been applied towards the solution to this corrosion process with different degrees of success. One such solution is disclosed in U.S. Pat. No. 3,879,234 which teaches a method of applying an insulation coating of MgO on magnetic silicon steel. The coating is applied in the form of a suspension of MgO and/or Mg-hydroxide in water. Another solution is disclosed in U.S. Pat. No. 2,820,720 which teaches applying a small amount of dielectric or ferrite powder to the surface of a ferrite body and sintering to form a first encapsulating coating. After the sintered body is allowed to cool, a suitable glass is flowed over the sintered dielectric surface to form a second harder and less permeable coating.

Other patents of interest are: U.S. Pat. No. 2,844,363 which teaches the construction of a magnetic stirrer, which is highly resistant to solvents and corrosive reagents, by encasing a magnetized rod element in a protective coating of plastic (teflon) accomplished by spraying on two or more coats of the plastic in the form of an aqueous dispersion and then baking at less than 725° F.; U.S. Pat. No. 4,837,114 which teaches a method of applying an anticorrosive coating on Fe—B—R base permanent magnets by means of PVD coatings comprising of carbides, nitrides, borides, silicides and composite ceramics; and U.S. Pat. No. 4,201,831 which relates to coating magnetic particles with organic or polymeric materials and then heating to 100°–1,000° C. The heat decomposes the polymer to activated carbon which stays adhered to the magnetic particles. These particles are then used as magnetic adsorbent composites.

Many of the aforementioned methods are limited by the shape of the magnetic material that is to be encapsulated. That is the encapsulating material can not surround a complex shaped magnet. Additionally, many coatings are not strongly resistant to corrosion, which is true especially of plastic. Glass also is vulnerable to attack by certain corrosive materials, and all are subjected to wear and abrasion which eats through the encapsulation coating to expose the inner magnet.

Based on the above there exists a need for an encapsulation process that is usable with different shapes of encapsulated bodies, is highly corrosion resistant, and is wear and abrasion resistant. The present invention fills that need.

SUMMARY OF THE INVENTION

The present invention is directed to overcoming one or more of the problems set forth above. Briefly summarized, according to one aspect of the present invention a method for ceramic coating a magnet comprising the steps of:

a) encapsulating the magnet with a sacrificial material;

b) encapsulating the magnet and the sacrificial material with a ceramic material;

c) heating the encapsulated magnet of step b) to a temperature that burns the sacrificial material; and d) sintering the ceramic material so as to permit the permeation of the burned sacrificial material through the ceramic material.

From the foregoing it can be seen that it is a primary object of the present invention to provide an improved corrosion resistant magnet.

It is another object of the present invention to provide a method for encapsulating complex-shaped bodies with a highly wear and abrasion resistant material.

These and other aspects, objects, features, and advantages of the present invention will be more clearly understood and appreciated from a review of the following detailed description of the preferred embodiments and appended claims, and by reference to the accompanying drawings.

Advantageous Effect Of The Invention

The present invention has the following advantages:

It enables the use of high strength rare earth magnetic materials in applications entailing the use of corrosive or hazardous materials.

It enables the fabrication of complex custom shaped parts and components which have desired magnetic properties as well as other surface characteristics such as reduced friction, and improved wear and abrasion resistance.

This process is ideal for the inexpensive mass fabrication of custom shaped magnets with protective encasements.

Because of the containment of the magnet within the non-corrosive ceramic material the power source for rotating the magnet can be located outside of a container storing a caustic chemical with the encapsulated magnet floating in the container thereby precluding hazardous electrical interactions.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
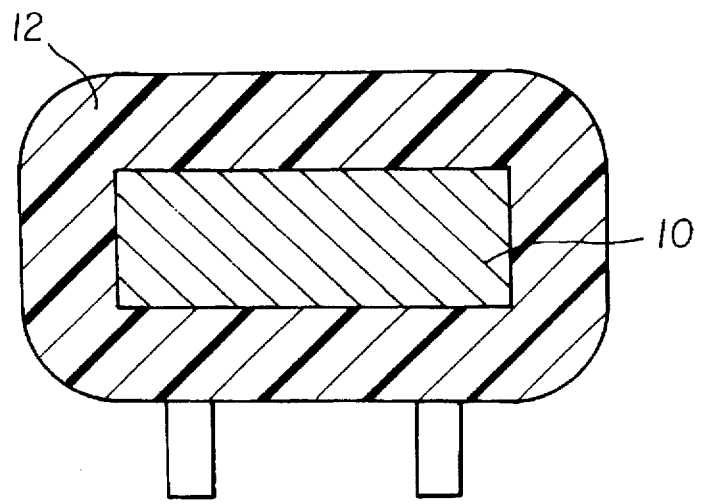
FIG. 1 is a sectioned view of a magnet encapsulated in a sacrificial container.

Referring to FIG. 1, a permanent magnet 10 is enclosed in a sacrificial container 12. The container 12 is made from a low melting point material that "burns clean" such as PVA, PEG, acrylic, or any organic materials. The sacrificial container 12 is larger than the magnet 10 so as to compensate for the anticipated shrinkage of the ceramic material to be next applied during the sintering phase.

Figure 2:
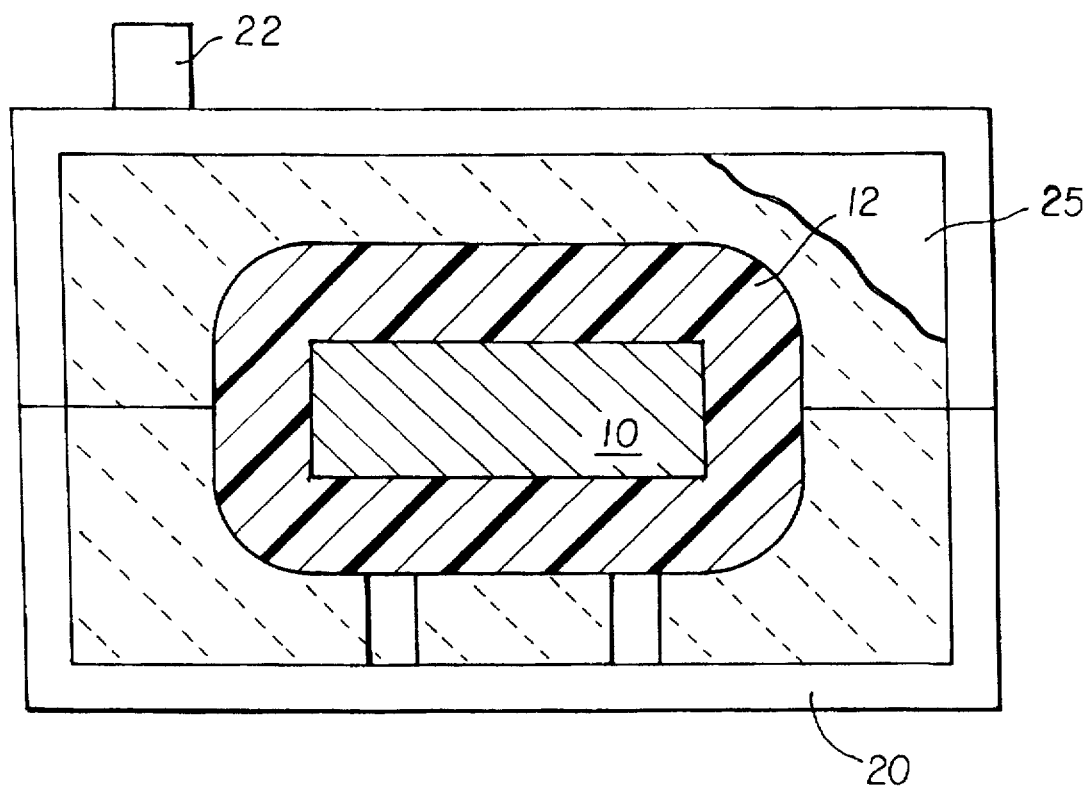
FIG. 2 is a sectioned view of the encapsulated magnet of FIG. 1 centrally positioned within a ceramic mold.

Referring to FIG. 2, the container 12, with the magnet 10 inside is then centrally located inside a split mold 20 which is designed to form a molded ceramic part to a desired shape. A corrosion resistant green ceramic material 25 is injected into the split mold 20 via an opening 22 or other convenient means to form around the sacrificial container 12. The green ceramic material can be any type oxide, carbide, nitride, boride, floride ceramics or combination thereof.

Figure 3:
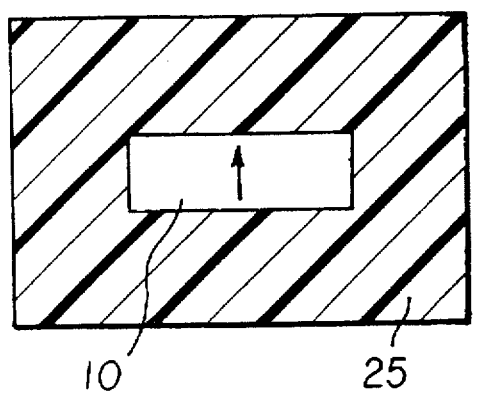
FIG. 3 is a sectioned view of the encapsulated magnet of FIGS. 1 and 2 shown surrounded by sintered ceramic material, after the sacrificial container has been burned off.

Once the ceramic material is incorporated into the mold, the entire assembly is sintered at a temperature range of 1200° to 1600° C. During this process the sacrificial container 12 burns off and the ceramic material 25 shrinks around the magnet 10 completely encapsulating it as shown in FIG. 3. As a part of this process, the ceramic material 25 is preferentially cooled from one side so as to align the c-axis of the magnetic material 10 in a preferred orientation.

Figure 4:
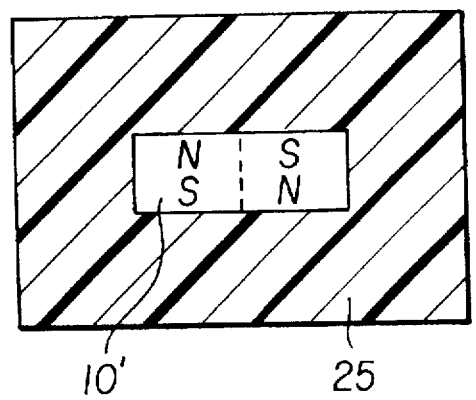
FIG. 4 is a sectioned view of the type shown in FIGS. 1–3 with the magnet being a multipole magnet.

Referring to FIG. 4, once the ceramic material 25 is sintered, the magnet 10 is polarized using standard wire magnetizing fixtures thereby producing a multipole magnet 10' encapsulated in a corrosion resistant ceramic case having a prespecified shape.

Figure 5:
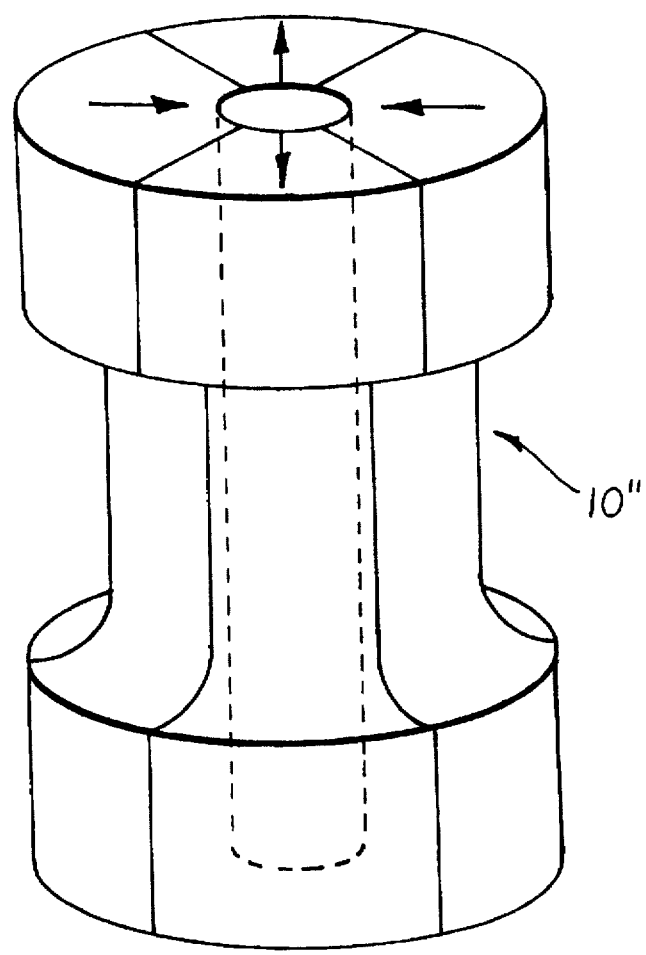
FIG. 5 is a perspective view of a complex shaped element that is to be encapsulated in a ceramic.

FIG. 5 illustrates an embodiment that has compound shapes which form a more complex element 10" such as a radially polarized cylindrical magnet. In this instance the sacrificial material is applied by spraying the material onto the element 10" to achieve a relatively uniform thickness of the sacrificial material. Other techniques of applying the sacrificial material may be used with satisfactory results such as spin coating, electrostatic coating, and dip coating. The thickness of the sacrificial material may vary across the surface of the encapsulated element, but the thickness is not to be smaller than the amount of shrinkage that will occur when the ceramic material is sintered otherwise the ceramic may crack permitting entry of foreign material to the element encapsulated therein.

The invention has been described with reference to a preferred embodiment. However, it will be appreciated that variations and modifications can be effected by a person of ordinary skill in the art without departing from the scope of the invention.

PARTS LIST 10 magnet
10' multipole magnet
10" radially polarized cylindrical magnet
12 sacrificial container
20 split mold
22 opening
25 ceramic material

We claim:

1. A method for ceramic coating a magnet comprising the steps of:

a) encapsulating the magnet with a sacrificial material;
   b) encapsulating the magnet and the sacrificial material with a ceramic material;
   c) heating the encapsulated magnet of step b to a temperature that burns the sacrificial material; and
   d) sintering the ceramic material so as to permit the permeation of the burned sacrificial material through the ceramic material.

2. A method for forming a ceramic coated magnet comprising the steps of:

a) encapsulating a magnetizable material with a sacrificial material;
   b) encapsulating the magnetizable material and the sacrificial material with a ceramic material;
   c) heating the encapsulated magnetizable material of step b to a temperature that burns the sacrificial material;
   d) sintering the ceramic material so as to permit the permeation of the burned sacrificial material through the ceramic material; and
   e) applying a magnetic force to the magnetizable material as it is cooled so as to cause a desired alignment of the magnetizable material's magnetic axis whereby a ceramic coated magnet is formed.

* * * * *

UNITED STATES PATENT AND TRADEMARK OFFICE
CERTIFICATE OF CORRECTION

PATENT NO. : 5,711,912
DATED : January 27, 1998
INVENTOR(S) : Dilip K. Chatterjee, Edward P. Furlani, Syamal K. Ghosh It is certified that error appears in the above-identified patent and that said Letters Patent is hereby corrected as shown below:

Title page, item [54] and col. 1, line 2,
Title: delete "IS" and replace with --IN--.

Title page, item [22], Filing Date:
delete "Jun. 16, 1996" and insert --Jun. 10, 1996--.

Signed and Sealed this

Third Day of November, 1998

*Attest:*

BRUCE LEHMAN

*Attesting Officer*

*Commissioner of Patents and Trademarks*